United States Patent Office 3,578,387
Patented May 11, 1971

3,578,387
DYEING HAIR WHILE SIMULTANEOUSLY
LIGHTENING ITS COLOR
Charles Zviak, Franconville, and Giuliana Ghilardi,
Paris, France, assignors to L'Oreal, Paris, France
No Drawing. Filed Feb. 13, 1967, Ser. No. 615,330
Claims priority, application Luxembourg, Feb. 15, 1966,
50,461; Aug. 22, 1966, 51,804
Int. Cl. A61k 7/12
U.S. Cl. 8—10.1                                   6 Claims

ABSTRACT OF THE DISCLOSURE

This invention relates to a process for simultaneously dyeing hair and lightening its color and to specific compositions for use in carrying out that process. These compositions contain in combniation a water-soluble dye which is either an anthraquinone dye or a nitrated derivative of benzene, together with an azo dye or an anthraquinone dye which are insoluble in water, and hydrogen peroxide.

BACKGROUND OF THE INVENTION

It is known in the cosmetic field that when it is desirable to color a head of hair comprising white hair while also making it two or three shades lighter, the only heretofore known solution yielding satisfactory results is the simultaneous use of oxidation dyes and hydrogen peroxide in a basic, preferably ammoniacal, medium.

Only the bleaching dyes thus obtained have had all the necessary characteristics from the practical point of view. In particular, a good uniformity of shade is obtained regardless of the state of the hair to which the solution is applied. The solution will not stain the scalp. Moreover, the dye has a satisfactory fastness with respect to light, subsequent washing, reducing agents, alkalis, acids or mild oxidizing agents.

SPECIFICATION

One object of the present invention is to introduce, as a new article of manufacture, a bleaching dye composition for human hair, essentially characterized by the fact that it consists, on one hand, of at least one water-soluble dye normally used for dyeing hair, taken from the group consisting of the nitrated derivatives of benzene and the water-soluble anthraquinone dyes; and, on the other hand, at least one disperse dye taken from the group consisting of the anthraquinone dyes and those azo dyes which are insoluble in water; and finally of hydrogen peroxide mixed with said dyes.

Among the water-soluble nitrated derivatives of benzene which may be used as dyes in the compositions according to the invention are the dyes of one of the following groups formed by:

(a) The derivatives of nitroparaphenylene-diamine having the formula:

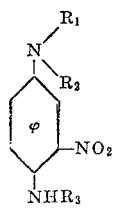

(I)

in which $R_1$, $R_2$ and $R_3$ may be identical or different and may represent a hydrogen atom, a loyer alkyl radical, a lower hydroxyalkyl radical or a

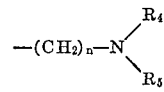

radical, $n$ being a whole number between 2 and 6 inclusive, $R_4$ and $R_5$ being identical or different and representing a hydrogen atom, a lower alkyl radical or a lower hydroxyalkyl radical and which may be part of a heterocyclic ring. The

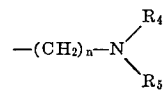

radical possibly being quaternized when the nitrogen is tertiary and $R_2$ may also represent a $\beta$-hydroxyethylaminopropyl radical or a diethylaminoethyl radical, when $R_1$ does not represent a

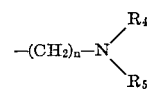

radical;

(b) The derivatives of nitroorthophenylene-diamine having the formula:

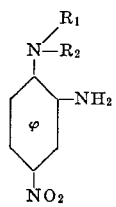

(II)

in which $R_1$ and $R_2$ have the significances above-indicated, and $R_2$ never represents a $\beta$-hydroxyethylaminopropyl radical or a diethylaminoethyl radical;

(c) The derivatives of nitrometaphenylene-diamine having the formula:

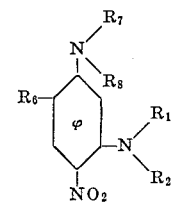

(III)

in which $R_1$ and $R_2$ have the significances above-indicated although one of them not representing a lower hydroxyalkyl when the other represents a

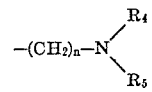

group, this exception holding only when at least one of the radicals $R_7$ and $R_8$ hereafter defined represents something other than a hydrogen atom; $R_4$ and $R_5$ having the above-indicated significances, but not representing a lower hydroxyalkyl group; $R_6$ representing a hydrogen atom, a lower alkyl radical or a lower alkoxy radical; $R_7$ and $R_8$ being identical or different and representing a hydrogen atom, a lower alkyl radical or a lower hydroxyalkyl radical;

(d) The nitrated derivatives of benzene having the formula:

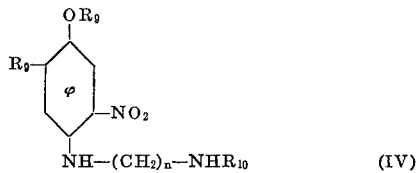

(IV)

in which $R_9$ represents a hydrogen atom or a lower alkyl radical and $R_{10}$ represents a hydrogen atom, a lower alkyl radical or a lower hydroxyalkyl radical;

(e) The derivatives of nitraniline having the formula:

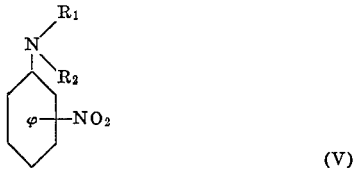

(V)

in which $R_1$ and $R_2$ have the above-indicated meanings, but $R_2$ never represents a β-hydroxyethylaminopropyl radical or a diethylaminoethyl radical.

Among the water-soluble anthraquinone dyes which may be used are dyes having the following formula:

$$A-NH-(CH_2)_n-NHR' \quad (VI)$$

in which R' represents a hydroxyalkyl radical, a lower alkyl radical, or a hydrogen atom, $n$ is an integer between 2 and 6 inclusive and A represents an anthraquinone radical, having the formula:

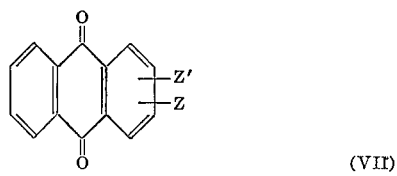

(VII)

in which Z' represents a hydrogen atom or an $NHR_1$ group, $R_1$ represents a hydrogen atom or a lower alkyl radical and Z represents a hydrogen atom or an NHR″ group, R″ represents a hydrogen atom, a lower alkyl group or a $-(CH_2)_n-NHR'$ group, R' and $n$ having the above-indicated significances, it being understood that on the anthraquinone ring, the $NH-(CH_2)_n-NHR'$ chain shown in Formula VI can occupy only:

(1) Either position 1, in which case the radical Z' represents a hydrogen atom and the radical Z, if it represents anything other than a hydrogen atom, can occupy only positions 4, 5 and 8;

(2) Or position 2, in which case the radical R' and the radicals Z and Z' represent a hydrogen atom;

(3) Or position 5, in which case R' may represent only a hydrogen atom, the radical Z' represents an $NHR_1$ group in position 4 and the radical Z represents an $NHR_2$ group in position 1, $R_2$ representing a hydrogen atom or a lower alkyl radical, and $R_1$ and $R_2$ being identical or different.

Among the disperse dyes insoluble in water which may be used in compositions according to the invention are dyes such as those known under the trademarks "Cibacete," "Acetoquinone Lumiere," "Irgaete," or even weakly acid dyes such as those known under the trademarks "Cibalane" and "Irgalane." Among the other disperse dyes which may be used are the azo dyes having the formula:

$$A'-NR_{11}-(CH_2)_n-NHR_{12} \quad (VIII)$$

in which A' represents a $B_1-N=N-B_2$ radical in which $B_1$ and $B_2$ are aromatic rings which may or may not be substituted by one or more nitro, halo, alkyl, hydroxy or amino-acyl groups, $R_{11}$ and $R_{12}$ being identical or different and representing a hydrogen atom, a lower alkyl radical or a lower hydroxyalkyl radical and $n$ being a whole number between 2 and 6 inclusive.

It will be noted that with the coloring compositions according to the invention it is possible to obtain a whole range of shades, and in particular of natural shades. The shades obtained are, in general, very uniform over the whole hair, even when some white hair is present.

It will be noted that the hair shades obtained with compositions according to the invention are more stable in light than shades obtained using only oxidation dyes.

The compositions according to the invention comprising direct non-oxidizable dyes have the advantage, with respect to oxidation dyes, of keeping better. Nevertheless, the compositions according to the invention should preferably be prepared just before use by adding the desired quantity of hydrogen peroxide to the mixture of dyes used.

The coloring compositions according to the invention may also comprise solvents normally used in cosmetics, such as ethyl alcohol, propyl alcohol or solvents with a small dielectric constant which are miscible in water such as, for example, ethyleneglycolmonobutylether, phenylethyl alcohol, n-butyl alcohol, secondary butyl alcohol, cyclohexanol or a mixture of these solvents.

On the other hand, the composition according to the invention may include anionic, cationic, or nonionic surface active agents, thickeners, or perfumes.

The pH of the compositions according to the invention, may be regulated by using organic or mineral bases such as ammonia, morpholine or monoethanolamine. It should be between 8 and 11, and preferably between 9 and 10.

Another object of the present invention is to provide a process for dyeing human hair essentially characterized by the fact that a coloring composition according to the invention, such as defined above, is allowed to act on the hair for from 15 to 45 minutes, the hair then being shampooed, rinsed and dried.

In order that the invention may be better understood, several methods of carrying it out will now be described, purely by way of illustration, without suggesting that the scope of the invention is limited to the details of the examples given.

EXAMPLE I

The following composition is prepared:

| | G. |
|---|---|
| 1 - methyl - amino - 2 - nitro-4-N,N-(bis-β-hydroxyethyl)-aminobenzene | 7 |
| 4-aminoazobenzene | 1.5 |
| Dye known under the trademark "CI disperse blue I" (No. 64500 of the Color Index) | 4.5 |
| Dye known under the trademark "CI disperse violet 4" (No. 61105 of the Color Index) | 4.7 |
| Dye known under the trademark "CI disperse yellow 1" (No. 10345 of the Color Index) | 6 |
| Phenylethyl alcohol | 5 |
| Ethyl alcohol | 50 |
| Carboxymethylcellulose | 40 |
| 20% Ammonia | 100 |
| Water, q.s.p. | 1000 |

30 cm.³ of this solution are mixed with 30 cm.³ of hydrogen peroxide at 20 volumes and applied to chestnut hair comprising 40% white hair. At the end of 20 to 25 minutes, the hair is rinsed and shampooed. After drying, a light chestnut is obtained and the white hair is no longer visible.

EXAMPLE II

The following composition is prepared:

| | G. |
|---|---|
| 1 - methyl - amino - 2 - nitro-4-N,N-(methyl-β-hydroxyethyl)-aminobenzene | 0.32 |
| 1 - amino - 2 - nitro-4-methylaminobenzene | 0.03 |
| Nitrometaphenylene-diamine | 0.02 |

| | G. |
|---|---|
| Dye known under the trademark: "CI disperse blue 19" (No. 61110 of the Color Index) | 0.23 |
| Dye known under the trademark: "CI disperse violet 4" (No. 61105 of the Color Index) | 0.23 |
| Dye known under the trademark: "CI disperse yellow 1" (No. 10345 of the Color Index) | 0.7 |
| Dye known under the trademark: "CI disperse red 17" (No. 11210 of the Color Index) | 0.05 |
| Ethyleneglycolmonobutylether | 3 |
| Phenylethyl alcohol | 1 |
| Urea | 1 |
| Lauric alcohol oxyethylenated with 10 molecules of ethylene oxide | 5 |
| 20% ammonia | 10 |
| Carboxymethylcellulose | 4 |
| Water, q.s.p. | 100 |

30 cm.³ of this solution are mixed with 30 cm.³ of hydrogen peroxide at 20 volumes and applied to medium chestnut hair with 30% white hair. After 20 to 25 minutes, the hair is rinsed and shampooed. After drying, a uniform deep blond with hazel glints is obtained.

EXAMPLE III

The following composition is prepared:

| | G. |
|---|---|
| Nitroparaphenylenediamine | 5 |
| Picramic acid | 2 |
| Urea | 10 |
| Lauric alcohol oxyethylenated with 10 molecules of ethylene oxide | 50 |
| Carboxymethylcellulose | 40 |
| 20% ammonia | 100 |
| Water, q.s.p. | 1000 |

30 cm.³ of this solution are mixed with 30 cm.³ of hydrogen peroxide at 20 volumes and applied to deep chestnut hair. After 20 to 25 minutes the hair is rinsed and shampooed. After drying a light chestnut with copper glints is obtained.

EXAMPLE IV

The following coloring composition is prepared:

4-(N-ethyl - β - aminoethyl)-amino-4'-nitroazobenzene—0.08 g.
4-methylamino-3-nitro-(δ-aminobutyl)-aminobenzene dihydrochloride—0.30 g.
4-nitro-3-γ-aminopropylamino - 1 - N,N - dimethylaminobenzene—0.06 g.
Lauryl ammonium sulfate with 20% lauric alcohol—5 g.
Ammonia solution containing 20% NH₃—10 cm.³
Water, q.s.p.—100 g.

At the moment of application, 10 cm.³ of this composition are mixed with 10 cm.³ of hydrogen peroxide at 20 volumes and applied to chestnut hair. It is left for 20 minutes, then the hair is rinsed and shampooed. A deep golden blonde is obtained.

It will be noted that the methods of carrying out the invention which have just been described have been given purely by way of example and that the scope of the invention is not limited to the details thereof. Other water soluble dyes include nitroparaphenylenediamine,
1-N-methylamino-3-nitro-4-aminobenzene,
methyl-[4-hydroxyanthraquinonyl-1-aminoethylmethyl morpholinium] sulfate,
4-amino-3-nitro-1-aminoethylaminobenzene,
bis-methyl[1-5(trimethylammonium)-propylamino-anthraquinone] sulfate,
4-methylamino-3-nitro-1-aminoethylaminobenzene,
methyl-[1-(methylmorpholinium)-ethyl-4-hydroxy-anthraquinone] sulfate,
4-N-γ-aminopropylamino-1-N'-methylamino-anthraquinone,
1-γ-aminopropylaminoanthraquinone,
5-γ-aminopropylamino-1,4-diaminoanthraquinone,
4-N-γ-aminopropylamino-1-N'-methylamino-anthraquinone,
1-methyl-2-amino-4-β-aminoethylamino-5-nitrobenzene,
4-N-methylamino-3-nitro-1-N-β-aminoethylaminobenzene hydrobromide,
3-nitro-4-β-aminoethylaminoanisole hydrochloride,
4-nitro-3-β-aminoethylamino-1-N,N-dimethylamino-benzene, etc.

What is claimed is:
1. A composition for simultaneously dyeing and lightening human hair comprising an aqueous solution containing a coloring amount of a water-soluble dye selected from the group consisting of nitrated substituted benzene and water-soluble anthraquinone hair dyes and a disperse dye selected from the group consisting of anthraquinone and azo hair dyes which are not soluble in water, and a hair lightening amount of hydrogen peroxide.
2. The composition of claim 1 in which said nitrated benzene hair dye is selected from the group consisting of:
(a) a nitroparaphenylenediamine corresponding to the formula:

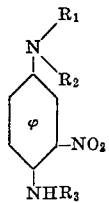

(I)

in which $R_1$, $R_2$, and $R_3$ are selected from the group consisting of hydrogen, lower alkyl, lower hydroxyalkyl and

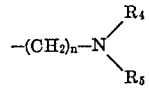

in which $n$ is a whole number between 2 and 6 inclusive, $R_4$ and $R_5$ are selected from the group consisting of hydrogen, lower alkyl and lower hydroxyalkyl, and together form morpholine, while

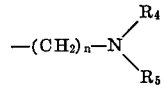

may be quaternized when the nitrogen is tertiary, and $R_2$ may represent β-hydroxyethylaminopropyl or diethylaminoethyl, except when $R_1$ represents

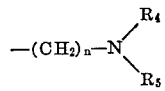

(b) a nitroorthophenylenediamine corresponding to the formula:

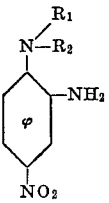

(II)

in which $R_1$ and $R_2$ have the significances hereinbefore indicated, but $R_2$ and $R_1$ must be the same;

(c) a nitrometaphenylenediamine corresponding to the formula:

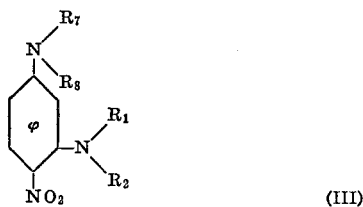

in which $R_1$ and $R_2$ have the significances hereinbefore indicated, but neither $R_1$ nor $R_2$ represents lower hydroxyalkyl when the other represents

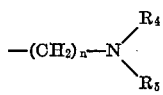

and when $R_7$ or $R_8$ as hereinafter defined represent something other than hydrogen; $R_4$ and $R_5$ have the significances hereinbefore indicated, except that neither represents lower hydroxyalkyl, $R_6$ is selected from the group consisting of hydrogen, lower alkyl, lower alkoxy and halogen; and $R_7$ and $R_8$ may be, but are not necessarily identical, and are selected from the group consisting of halogen, lower alkyl and lower hydroxyalkyl; and (d) a nitrated benzene corresponding to the formula:

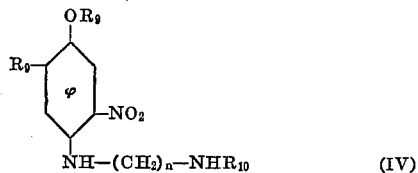

in which $R_9$ is selected from the group consisting of hydrogen and lower alkyl, while $R_{10}$ is selected from the group consisting of lower alkyl and lower hydroxyalkyl.

3. The hair coloring composition of claim 1 in which the anthraquinone hair dye which is soluble in water corresponds to the following formula:

$$A—NH—(CH_2)_n—NHR' \quad (VI)$$

in which R' represents hydroxyalkyl, lower alkyl or hydrogen, $n$ is an integer between 2 and 6 inclusive in which A represents an anthraquinone radical having the formula:

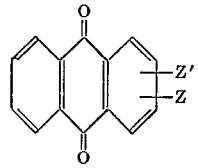

in which Z' is selected from the group consisting of hydrogen and NHR in which R is selected from the group consisting of hydrogen and lower alkyl and Z is selected from the group consisting of hydrogen and NHR'' in which R'' is selected from the group consisting of hydrogen, Z' represents NHR in position 4, Z represents $n$ have the significances hereinbefore indicated, and the NH—(CH₂)$_n$—NHR' chain of Formula VI must occupy one of the following ring positions:

(a) position 1, in which case Z' represents hydrogen and Z, when other than hydrogen, occupies one of the positions 4, 5 and 8;

(b) position 2, in which case R', Z and Z' each represent hydrogen;

(c) position 5, in which case R' must represent hydrogen, Z' represents NHR in position 4, Z represents NHR₂ in position 1, with R₂ representing a member selected from the group consisting of hydrogen and lower alkyl.

4. The composition of claim 1 having a pH between 8 and 11.

5. The composition of claim 1 having a pH between 9 and 10.

6. A method of simultaneously coloring and lightening human hair comprising applying to said hair an effective amount of the composition of claim 1.

References Cited

UNITED STATES PATENTS

| | | | |
|---|---|---|---|
| 2,983,651 | 5/1961 | Seemuller | 8—10.1 |
| 3,049,393 | 8/1962 | Seemuller | 8—10 |
| 3,098,013 | 7/1963 | Austin et al. | 8—10.1 |
| 3,098,794 | 7/1963 | Dohr et al. | 8—10.1 |
| 3,193,464 | 7/1965 | Edman et al. | 424—62 |

ALBERT T. MEYERS, Primary Examiner

V. C. CLARKE, Assistant Examiner

U.S. Cl. X.R.

8—10; 424—62